United States Patent
Fenton et al.

(10) Patent No.: US 9,821,843 B1
(45) Date of Patent: Nov. 21, 2017

(54) TIE ROD

(71) Applicant: Robert Bosch Automotive Steering, LLC, Plymouth, MI (US)

(72) Inventors: Matthew J. Fenton, Milford, MI (US); Andrew R. Weiser, Royal Oak, MI (US); Robert L. Neidlinger, II, Royal Oak, MI (US)

(73) Assignee: Robert Bosch Automotive Steering LLC, Plymouth, MI (US)

( * ) Notice: Subject to any disclaimer, the term of this patent is extended or adjusted under 35 U.S.C. 154(b) by 0 days.

(21) Appl. No.: 15/400,146

(22) Filed: Jan. 6, 2017

(51) Int. Cl.
*B62D 7/20* (2006.01)
*F16C 7/06* (2006.01)

(52) U.S. Cl.
CPC . *B62D 7/20* (2013.01); *F16C 7/06* (2013.01)

(58) Field of Classification Search
CPC ..................................... B62D 7/20; F16C 7/06
See application file for complete search history.

(56) References Cited

U.S. PATENT DOCUMENTS

| | | | | |
|---|---|---|---|---|
| 1,926,925 A * | 9/1933 | Wescott | ............. | E21B 17/0426 285/115 |
| 3,504,567 A * | 4/1970 | Ohashi | .................. | B62D 1/192 188/371 |
| 3,583,052 A * | 6/1971 | Herbenar et al. | ........ | B62D 7/20 29/517 |
| 4,018,132 A * | 4/1977 | Abe | ..................... | F16B 5/0275 411/413 |
| 4,097,163 A * | 6/1978 | Dubuque | ................ | F16B 39/02 29/517 |
| 4,254,809 A * | 3/1981 | Schuster | ................. | F16B 19/05 411/167 |
| 4,338,054 A * | 7/1982 | Dahl | ..................... | F16B 35/041 29/407.02 |
| 4,500,224 A * | 2/1985 | Ewing | ................... | E21B 17/043 285/92 |
| 4,628,758 A * | 12/1986 | Yuzuriha | .................. | B62D 1/20 403/14 |
| 4,890,949 A * | 1/1990 | Wood, Jr. | ................ | B62D 7/18 403/140 |
| 5,104,136 A * | 4/1992 | Buhl | ..................... | B60G 7/001 188/371 |
| 5,433,570 A * | 7/1995 | Koppel | ................. | E04D 3/3603 411/387.1 |
| 5,529,316 A * | 6/1996 | Mattila | .................. | B62D 17/00 280/93.51 |
| 5,537,814 A * | 7/1996 | Nastuk | .................... | F01D 5/066 60/796 |
| 6,428,236 B2 * | 8/2002 | Aota | ........................ | F16C 3/03 403/359.5 |

(Continued)

*Primary Examiner* — Nicole T Verley
(74) *Attorney, Agent, or Firm* — Emch, Schaffer, Schaub & Porcello Co., L.P.A.

(57) ABSTRACT

The tie rod is designed to elongate when subjected to an overload in tension that is placed on the tie rod. A plurality of threads and a reduced diameter section on the tie rod elongated when subjected to a tension overload that exceeds the design parameters of the tie rod. The elongation of the tie rod is designed to provide a warning to the operator of the vehicle that the tie rod has been subjected to an overload and should be inspected and repaired as needed. The deformation and elongation of the tie rod absorbs energy and protects other components of the steering and suspension systems of the vehicle.

13 Claims, 4 Drawing Sheets

(56) References Cited

U.S. PATENT DOCUMENTS

| | | | |
|---|---|---|---|
| 6,830,223 B1 * | 12/2004 | Moore | B64C 13/20 244/220 |
| 6,902,342 B1 * | 6/2005 | Ditzler | F16B 7/06 403/78 |
| 7,140,825 B2 * | 11/2006 | Takahashi | F16B 25/0021 408/222 |
| 7,293,948 B2 * | 11/2007 | Bunch, Jr. | F16B 31/04 411/392 |
| 7,617,907 B2 | 11/2009 | Mair et al. | |
| 7,618,048 B2 | 11/2009 | Mair et al. | |
| 7,850,178 B2 * | 12/2010 | Fischer | B60G 7/003 280/86.758 |
| 8,277,142 B2 * | 10/2012 | Hoshino | B62D 1/16 403/315 |
| 8,307,939 B2 | 11/2012 | Hauck et al. | |
| 8,506,199 B2 | 8/2013 | Rump et al. | |
| 8,696,232 B2 | 4/2014 | Sokolihs | |
| 8,702,112 B1 * | 4/2014 | Belleau | B62D 7/20 280/89.12 |
| 8,763,221 B1 * | 7/2014 | Boss | B25B 27/023 29/235 |
| 8,882,425 B2 * | 11/2014 | Benjamin | F16B 33/02 411/116 |
| 9,206,852 B2 * | 12/2015 | Kaphengst | F16D 1/06 |
| 2002/0096851 A1 | 7/2002 | Seyuin | |
| 2005/0111908 A1 | 5/2005 | Green | |
| 2007/0068291 A1 | 3/2007 | Beatty | |
| 2008/0150248 A1 | 6/2008 | Mair et al. | |
| 2008/0167778 A1 | 7/2008 | Tsukasaki | |
| 2008/0240848 A1 * | 10/2008 | Rauschert | F16C 7/06 403/122 |
| 2009/0218777 A1 * | 9/2009 | Wood | B64C 1/06 280/93.51 |
| 2009/0308189 A1 * | 12/2009 | Tomaru | B62D 1/181 74/89.42 |
| 2010/0122606 A1 | 5/2010 | Stephan | |
| 2010/0259023 A1 | 10/2010 | Cebon | |
| 2011/0038665 A1 * | 2/2011 | Sokolihs | B60G 7/001 403/315 |
| 2012/0003032 A1 | 1/2012 | Rump et al. | |
| 2013/0298726 A1 | 11/2013 | Diekhoff et al. | |
| 2013/0313358 A1 | 11/2013 | Hale | |

* cited by examiner

TIE ROD

CROSS REFERENCE TO RELATED APPLICATIONS

This application claims the benefit of PCT/US15/41318 filed on Jul. 21, 2015, which claims benefit of U.S. provisional patent application Ser. No. 62/027,478 filed on Jul. 22, 2014.

BACKGROUND OF THE INVENTION

The invention relates to link elements comprising at least two substantially rod-shaped link sections that are used in the suspension of a vehicle. In particular the link elements are used to form a tie rod that is used in the steering system of the vehicle to guide the wheels to adjust to the desired steering angle.

Such link elements are crucial elements for the safe driving of a motor vehicle. The link elements are usually dimensioned with a high degree of stiffness and failure safety. When used as tie rods, the link elements often have a defined failure safety or buckling stability. In this manner a controlled buildup of energy in the event of a crash is appropriately controlled and adjacent components are protected against damage. In prior art tie rod applications the link elements have been designed to buckle when subjected to compression type loads on the vehicle suspension system. It is important that the link elements have an ability to accommodate a load that exceeds the design limitation without completely failing. It is important that the link elements not become separated so that the basic drivability and steerabilty of the vehicle can be maintained even in the event of a significant overload condition. It is also desirable for the driver of the vehicle to be given an in that the tie rod has been subjected to a significant overload and that the steering system or vehicle suspension may become damaged due to the overload condition. It is important that the signaling to the driver is sufficient to warn the driver that the suspension and the steering system should be inspected and repaired.

In the current tie rod applications there is a lack of reliable systems that can effectively deal with an overload condition when the overload is provided in tension on the link elements. There is also a deficiency in tie rod systems that can progressively elongate under a tension load to provide a warning to the driver that the steering and/or suspension system has been subjected to an overload condition and needs to be inspected. There is further a lack of a tie rod assembly that can accommodate an overload condition in tension without having the complete failure of the steering and/or suspension system.

Accordingly, there is a need in the art for a tie rod assembly that can accommodate overload conditions in tension, provide a warning to the driver of the vehicle when the overload condition has elongated the tie rod while at the same time maintaining the tie rod in an operable condition. The tie rod of the present invention has been developed to overcome these deficiencies of the prior art.

SUMMARY OF THE INVENTION

The tie rod of the present invention is designed to elongate when subjected to an overload in tension that is placed on the tie rod. A plurality of threads and a reduced diameter section on the tie rod elongated when subjected to a tension overload that exceeds the design parameters of the tie rod. The elongation of the tie rod is designed to provide a warning to the operator of the vehicle that the tie rod has been subjected to an overload and should be inspected and repaired as needed. The deformation and elongation of the tie rod absorbs energy and protects other components of the steering and suspension systems of the vehicle.

Other objects and advantages of the present invention will become apparent to those skilled in the art upon a review of the following detailed description of the preferred embodiments and the accompanying drawings.

IN THE DRAWINGS

DETAILED DESCRIPTION OF THE INVENTION

Figure 1:
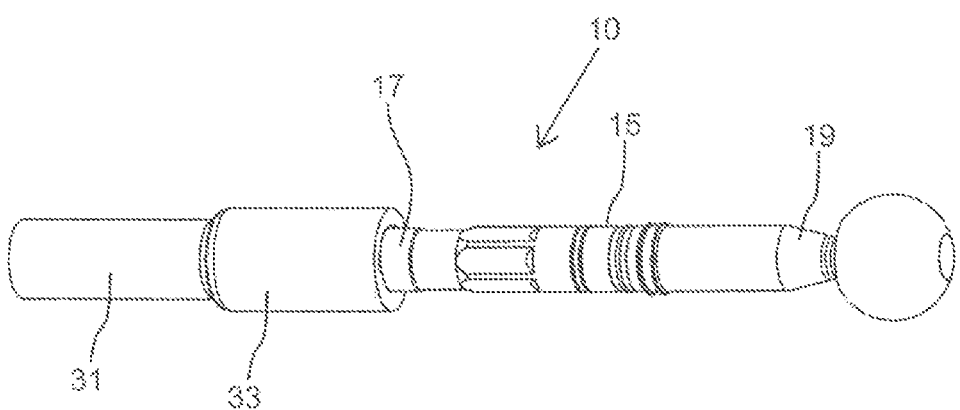
FIG. 1 is a perspective side elevation view of the tie rod of the present invention.
Figure 2:
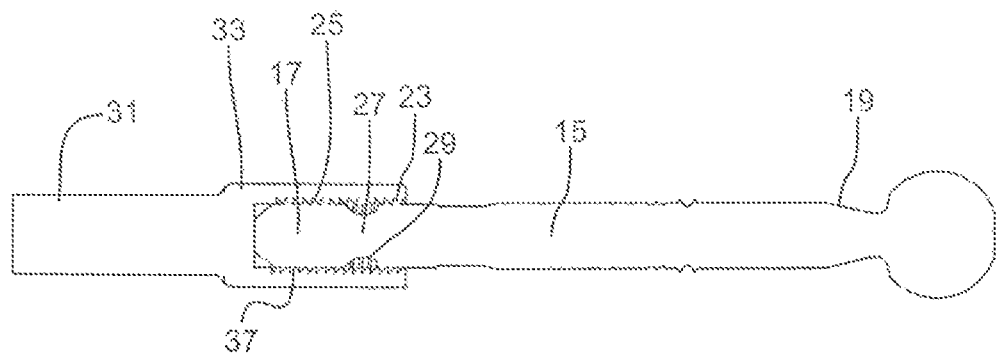
FIG. 2 is a side elevational cross-sectional view of the tie rod.
Figure 3:
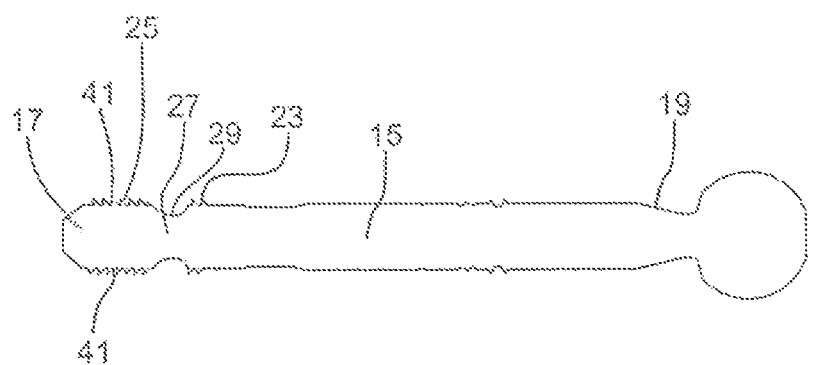
FIG. 3 is a side elevational cross-sectional view of one of the rod components of the tie rod.
Figure 4:
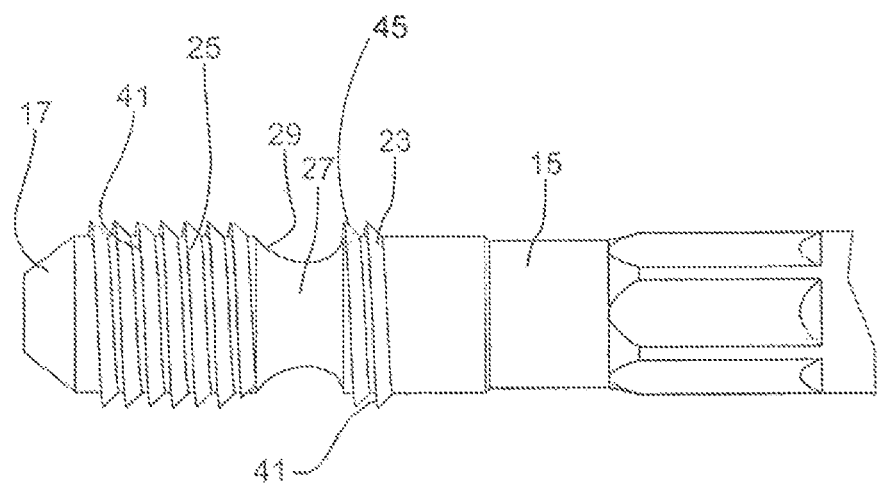
FIG. 4 is a partial side elevational view of one end of the rod element of the tie rod of the present invention.
Figure 5:
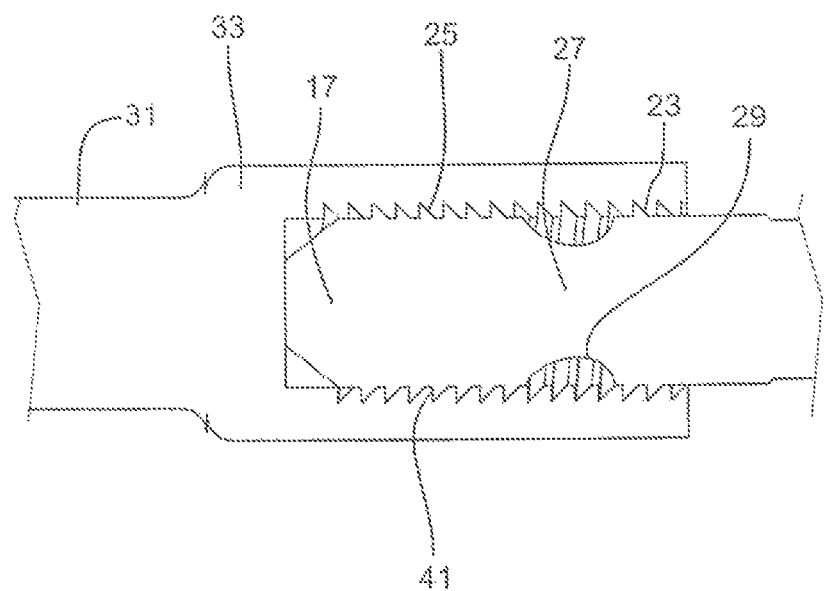
FIG. 5 is a partial side elevational cross sectional view.

The tie rod of the present invention is to be used with a vehicle. The tie rod is used to control the steered wheels of the vehicle. More particularly, the tie rod is designed to accommodate overload conditions that act in tension on the tie rod. The tie rod is designed to provide an indication that a tension overload has been encountered by the tie rod that compromises the proper function of the tie rod. The tie rod is also designed to elongate under tension overload conditions to protect the function of other components of the steering system. Other features and advantages of the invention will be more readily understood by referring to the drawings in connection with the following description.

Tie rods of the prior art have a link section. The link section has a threaded section for connection to further link sections on one end and a ball joint on the other end that is connected to the suspension of the vehicle. Such tie rods of the prior art do not have an overload function other than the simple buckling of the link in the event of compression overload in a direction towards the center of the vehicle. In such tie rods, the compression overload condition causes a bend or curve in the tie rod that may or may not significantly impact the functionality of the tie rod. In addition, there is no damage indicator if the overload forces are placed on the tie rod in the other direction, a tension overload, which is away from the center of the vehicle. In the application of a tension overload there is usually a complete failure of the tie rod before there is any indication of damage to the tie rod due to an overload.

The tie rod of the present invention, which is shown in the attached figures, has been designed to provide a progressive indication that the tie rod has been subjected to an overload sufficient to cause damage to the tie rod. When the overload reaches a predetermined magnitude, the overload protection feature will allow the tie rod to elongate to an extent that will significantly impact the handling of the vehicle and give the operator of the vehicle a clear warning that the tie rod and the suspension of the vehicle need to be checked and repaired. The yield of the material of the tie rod due to the overload condition results in a permanent change in the steering characteristics of the vehicle. The tie rod 10 of the present invention has a rod 15 having a first end 17 and a second and 19. A first plurality of threads 23 are positioned on the first end 17 of the rod 15. A reduced diameter section 27 is on the first end 17 of the rod 15 adjacent the first plurality of threads. The rod 15 is cylindrical with a generally circular cross sectional shape. The reduced diameter section 27 is a groove 29 that is formed in the rod 15. The groove usually has a semicircular shape and the width of the groove extends in a direction towards the longitudinal axis of the rod 15. The groove can also have a parabolic, elliptical or similar shape. The groove 29 has a depth that is from about 20% to about 40% of the diameter of the rod 15. The groove has a width that is from about 1 diameter to about 3 diameters of the rod.

A link 31, having a chamber 33 positioned on one end, forms another part of the tie rod. The chamber 33 has a plurality of threads 37 positioned on the interior of the chamber 33. The link 31 and the chamber 33 are generally cylindrical and have a substantially circular cross sectional shape. The plurality of threads 37 are disposed for engaging the first plurality of threads 23, that are positioned on the first end of the rod 15. The first plurality of threads 23 positioned on the rod 15 are designed to slip and deform when subjected to tension toads that exceed the design limits of the tie rod. The tension load that exceed the design limits, is a load that will cause the rod 15 to move in a direction away from the link 31. If sufficient tension load is placed on the tie rod 10, the reduced diameter section 27 is also designed to elongate. The elongation of the reduced diameter section happens as the first plurality of threads 23 have been subjected to the tension load that causes the first plurality of threads to slip and deform. The first plurality of threads 23 and the reduced diameter section 27 allow the tie rod 10 to deform and elongate, and to absorb loads or energy in tension over a longer distance. This results in the tie rod having the ability to progressively handle tension overloads and to modify the length of the tie rod progressively to provide a warning to the operator of the vehicle that an overload has occurred.

The first end 17 of the rod 15 that is positioned in the chamber 33 is designed to be secured to the link 31. To assist in this connection between the link 31 and the rod 15 is second plurality of threads 25 are positioned on the rod 15 on the opposite side of the reduced diameter section 27 from the first plurality of threads 23. The second, plurality of threads 25 are disposed on the end of rod 15 that extends the farthest into the chamber 33. The second plurality of threads threadingly engage the plurality of threads 37 in the chamber. A locking means, such as a glue, formed indentation or other means is used to keep the rod 16 from disengaging from the chamber 33. It should be recognized, however, that other securing means, other than the second plurality of threads can be utilized to secure the rod 15 to the link 31. As an example, a bore can be positioned to extend through the chamber 33 and the first end 17 of the rod 15. A pin could be positioned in the bore that extends through the chamber and the rod to secure the rod to the link 31.

The first and second pluralities of threads that are positioned on the first end 17 of the rod 15 are buttress threads. A buttress thread has a load resisting flank 41 that can accommodate compression loads that act against the flank that are much higher than toads that act against the buttress threads in the opposite direction. Such threads can accommodate large loads in one direction, but have a reduced capacity to handle loads in the opposite direction. In practice, the load that act against the flank 41 can be from about 1¼ to about 1¾ times larger than the forces that act on the threads in the opposite direction. In the present invention the load resisting flank is disposed toward the link 31 so that compression loads in a direction along the rod 15 towards the link 31 will be placed against the toad resisting flank. This results in the first and second pluralities of threads being able to accommodate compression loads that are much greater than the tension loads or toads that are directed in the opposite direction. The number of threads in the first and second plurality of threads and the thrust angle of the flank 41 can he adjusted to change the overload parameters of the tie rod. The first plurality of breads 23 will generally have a length less than 1 diameter of the rod 15 in threads and the second plurality of threads will have greater than 1.5 diameter of the rod 15 in threads. The thrust angle 45 of the flank 41 is usually from about 30° to about 60° with respect to the longitudinal axis of the rod 15. The size of the reduced diameter section and the configuration of the first and second plurality of threads can he adjusted to change the elongation parameters of the rod 15 in response to overloads in tension. This allows the tie rod to he adjusted for different vehicles or driving conditions.

In most uses, the first plurality of threads 23 are caused to slip and deform by the tension overload placed on the tie rod. Once the first plurality of threads have elongated the reduced diameter section 27 will elongate if the overload is sufficiently large. The progressive elongation results in a progressive compromise of the steering quality of the vehicle that give the operator of the vehicle an increasing indicator that the tie rod has been subjected to an overload that has compromised the effectiveness of the tie rod and the steering system. The deformation and elongation of the tie rod 15 absorbs energy and protects other components of the steering and suspension systems of the vehicle.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A tie rod to transmit steering motion to the wheels of a vehicle comprising:
   - a rod having a first end and a second end;
   - a first plurality of threads positioned on the first end, the first plurality of threads being buttress threads having a load resisting flank;
   - a reduced diameter section positioned on the first end of the rod adjacent the first plurality of threads;
   - a link having a chamber disposed on one end, the chamber having a plurality of threads that are disposed for engaging the first plurality of threads on the first end of the rod, the first plurality of threads being designed to slip and deform when subjected to tension loads that exceed the design limits of the tie rod; and
   - the load resisting flank disposed towards the link wherein the first plurality of threads can accommodate compression loads that are greater than the tension loads that can be accommodated by the first plurality of threads.

2. The tie rod of claim 1 wherein the reduced diameter section is designed to elongate when subjected to tension loads that have caused the first plurality of threads to elongate.

3. The tie rod of claim wherein the rod and link have a cylindrical shape with a circular cross section.

4. The tie rod of claim 3 wherein the reduced diameter section is a groove that extends around the outer perimeter of the rod.

5. The tie rod of claim 4 wherein the groove has a depth from 20% to 40% of the diameter of the rod.

6. The tie rod of claim 5 wherein the groove has a semi-circular, parabolic or elliptical shape.

7. The tie rod of claim 1 wherein the first plurality of thread contains less than 1 diameter of the rod in length of threads.

8. The tie rod of claim 1 wherein the load resisting flank has a thrust angle from 30% to 60% with longitudinal axis of the rod.

9. A tie rod to transmit steering motion to the wheels of a vehicle comprising:
   a rod having a first end and a second end;
   a first plurality of threads positioned on the first end;
   a reduced diameter section positioned on the first end of the rod adjacent the first plurality of threads;
   a second plurality of threads positioned on the first end of the rod adjacent the side of the reduced diameter section that is opposite to the first plurality of threads; and
   a link having a chamber disposed on one end, the chamber having a plurality of threads that are disposed for engaging the first plurality of threads on the first end of the rod, the first plurality of threads being designed to slip and deform when subjected to tension loads that exceed the design limits of the tie rod.

10. The tie rod of claim 9 wherein the second plurality of threads are buttress threads that have a load resisting flank disposed towards the link, the second plurality of threads being disposed to engage the plurality of threads in the chamber.

11. The tie rod of claim 10 wherein the first and second plurality of threads are the same size and configuration.

12. The tie rod of claim 10 wherein the second plurality of threads contains greater than 1.5 diameter of the rod in length of threads.

13. The tie rod of claim 10 wherein the load resisting flank has a thrust angle from 30% to 60% with the longitudinal axis of the rod.

* * * * *

UNITED STATES PATENT AND TRADEMARK OFFICE
CERTIFICATE OF CORRECTION

PATENT NO. : 9,821,843 B1  
APPLICATION NO. : 15/400146  
DATED : November 21, 2017  
INVENTOR(S) : Matthew J. Fenton et al.

Page 1 of 1

It is certified that error appears in the above-identified patent and that said Letters Patent is hereby corrected as shown below:

In the Claims

In Column 4, Line 66, please change "claim" to -- claim 1 --.

Signed and Sealed this  
Fifteenth Day of May, 2018

Andrei Iancu  
*Director of the United States Patent and Trademark Office*